(12) United States Patent
Tomlinson

(10) Patent No.: US 7,604,220 B1
(45) Date of Patent: Oct. 20, 2009

(54) WIRE GUIDE

(76) Inventor: Stanley Tomlinson, P.O. Box 400, Bismark, ND (US) 58502-0400

( * ) Notice: Subject to any disclaimer, the term of this patent is extended or adjusted under 35 U.S.C. 154(b) by 83 days.

(21) Appl. No.: 11/898,396

(22) Filed: Sep. 12, 2007

(51) Int. Cl.
*H02G 1/08* (2006.01)
*E21C 29/16* (2006.01)
*F16D 1/00* (2006.01)

(52) U.S. Cl. .................. 254/134.3 FT; 254/134.3 R

(58) Field of Classification Search ........ 254/134.3 FT, 254/134.3 R
See application file for complete search history.

(56) References Cited

U.S. PATENT DOCUMENTS

| 2,746,715 | A | * | 5/1956 | Sherrod | 254/134.3 R |
| 3,020,332 | A | * | 2/1962 | Appleton | 174/72 R |
| 3,944,184 | A | * | 3/1976 | Fisch | 254/134.3 R |
| 4,801,118 | A | * | 1/1989 | Wium | 248/300 |
| 4,909,481 | A | * | 3/1990 | Tamm | 254/134.3 R |
| 5,029,817 | A | * | 7/1991 | Tamm | 254/134.3 R |
| 6,672,567 | B1 | * | 1/2004 | Chembars | 254/134.3 FT |
| 6,838,615 | B2 | * | 1/2005 | Pyron | 174/50 |
| 7,419,136 | B2 | * | 9/2008 | Martinez | 254/134.3 FT |

* cited by examiner

Primary Examiner—Lee D Wilson

(57) ABSTRACT

A wire guide which is removably mounted to the top end of an electric box having a plurality of rollers to assist in the guiding of a single wire or a bundle of wires while at the same time protecting the wire from damage caused by contact with the electric box.

11 Claims, 4 Drawing Sheets

WIRE GUIDE

BACKGROUND OF THE INVENTION

1. Field of the Invention

An apparatus for use in guiding wire through an electric box which can be easily attached to the electric box without damaging the electric box. The wire is guided through the electric box with a plurality of rollers so as to avoid damage to the wire.

2. Description of Related Art

Electricians or technicians often are required to install a run of wire (e.g., electrical or communication wire) through an electric box and into lengths of conduit. When the wire enters the electric box at an angle, the edge of the electric box may scrape the wire causing damage.

One way in which electricians may run wire to prevent this damage is to prop up the wire such that there is virtually no angle in which the wire enters and/or exits the electric box or conduit. This is an attempt to prevent the wire from contacting the edge of the electric box or conduit entrance. However, these methods of running a wire are often not available to the electrician or technician as they often require multiple individuals on a single job and/or require the use of other objects (e.g., boxes, etc.) in which the wire must be propped upon to attain the desired entrance height. Further, the electrician or technician also must be able to pull the wire into the electric box or conduit without pulling at an angle. As a good portion of electric boxes or conduit lengths are installed in walls and ceilings, which are difficult to access in a linear fashion, these methods of pulling wires to prevent engagement with the edges of the electric box or conduit are difficult, if not impossible, to accomplish.

Many devices have been proposed in the prior art for guiding wire into an electric box. However, very few devices have been proposed which can be quickly and easily attached to a variety of electric box shapes and sizes. Furthermore, very few prior art devices are capable of guiding a single wire or a large bundle of wires into an electric box.

Accordingly, it is the primary object of the present invention to provide a durable, inexpensive and multi-use wire guide for quickly and easily guiding a single wire or bundled wires into and through an electric box without causing any damage to the wire(s).

SUMMARY OF THE INVENTION

A wire guide apparatus according to the present invention includes a roller frame having a first roller frame side and a second roller frame side and a plurality of rollers mounted between the roller frame sides. The roller frame sides are similar in construction with each frame side being flared at the ends so as to create a wider opening for the entering wire. A plurality of prongs extend above and parallel to a portion of the roller frames sides which prongs establish a sliding fit with the top side of an electric box.

Therefore, a general object of this invention is to provide a wire guide apparatus which can be quickly and easily attached to an electric box.

A further objective of this invention is to provide a wire guide apparatus which can be attached to a variety of electric box sizes.

It is the further object of the present invention to provide a wire guide apparatus which is made of durable materials.

It is the further object of the present invention to provide a wire guide apparatus which can assist in the guiding of a single wire or a bundle of wires.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications. Such modifications can, among others, include means for widening and/or narrowing the space between the roller frame sides so as to enable the apparatus to fit within a multitude of electrical boxes.

DETAILED DESCRIPTION OF THE PREFERRED EMBODIMENTS

The present invention and the various features and advantageous details thereof are explained more fully with reference to the non-limiting embodiments described in the following description. The present invention is comprised of a plurality of components. Such components are individually configured and correlated with respect to each other so as to attain the desired objective.

Figure 1:
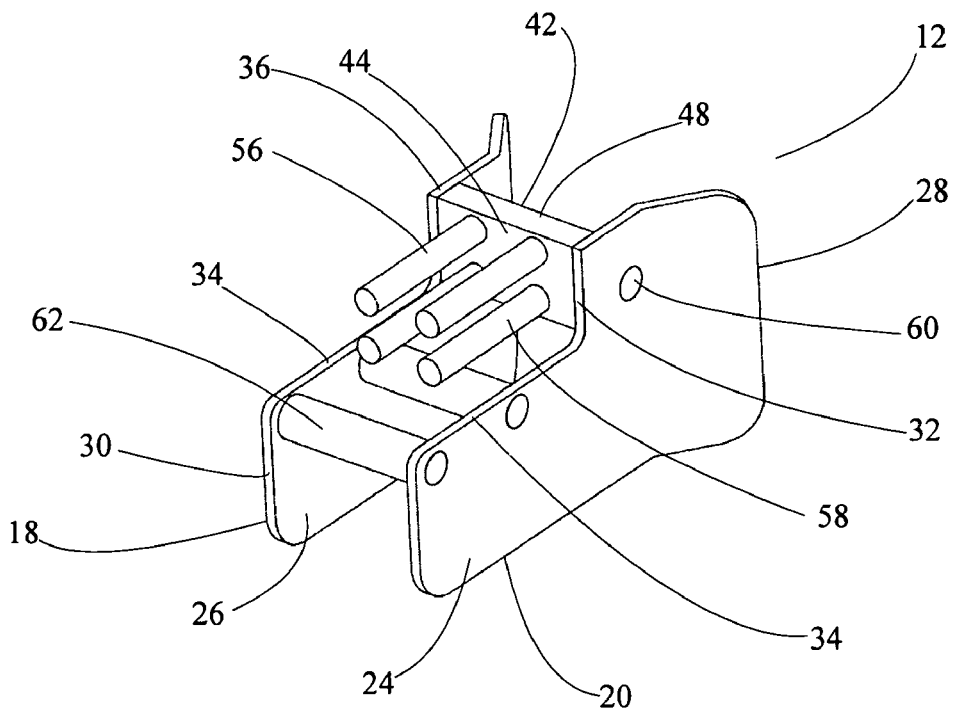
FIG. 1 is a perspective view of the wire guide in accordance with the preferred embodiments of the present invention.
Figure 2:
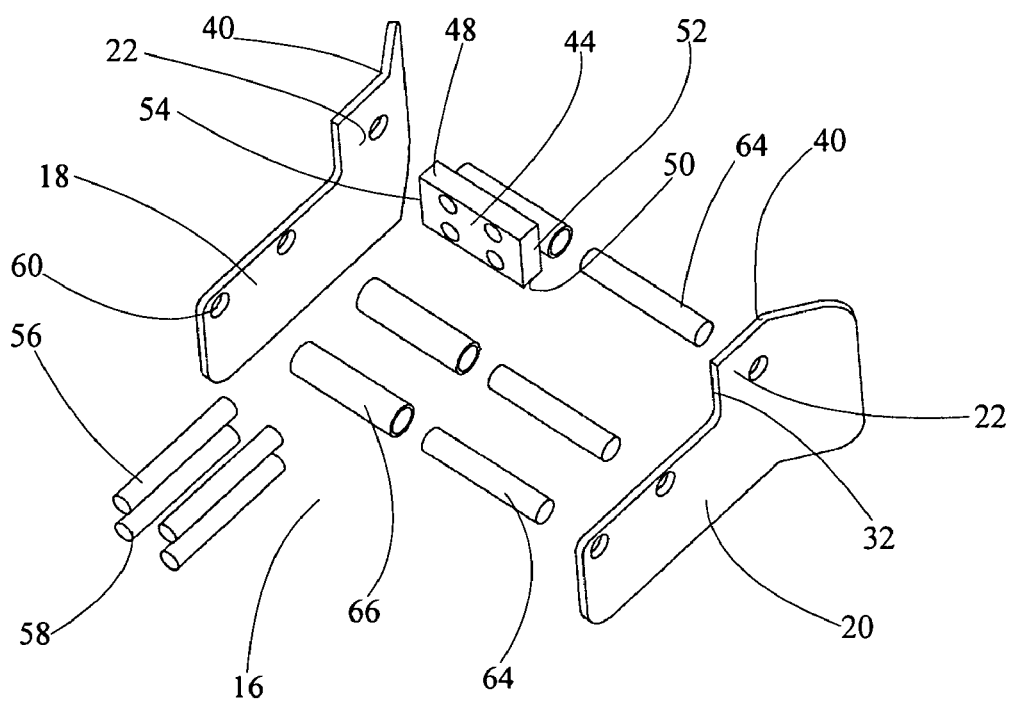
FIG. 2 is a perspective view of the wire guide illustrating the placement of the pins, rollers and side plates.
Figure 3:
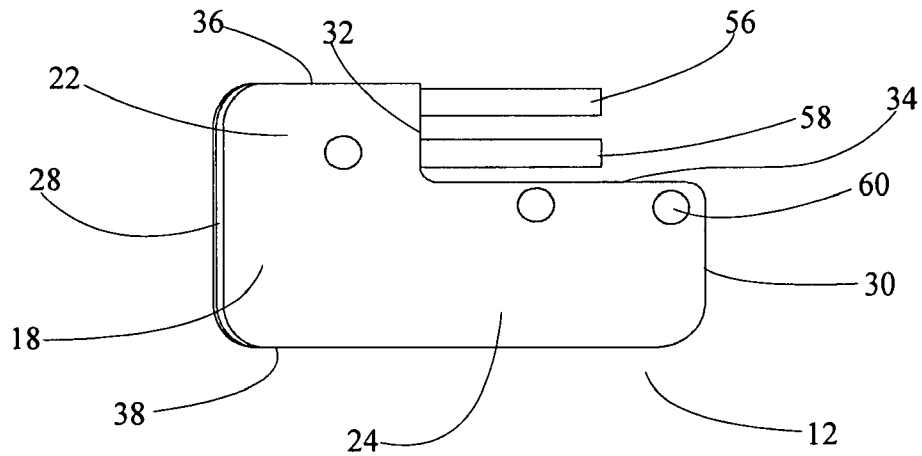
FIG. 3 is a side perspective view of the wire guide in accordance with the preferred embodiments of the present invention.
Figure 4:
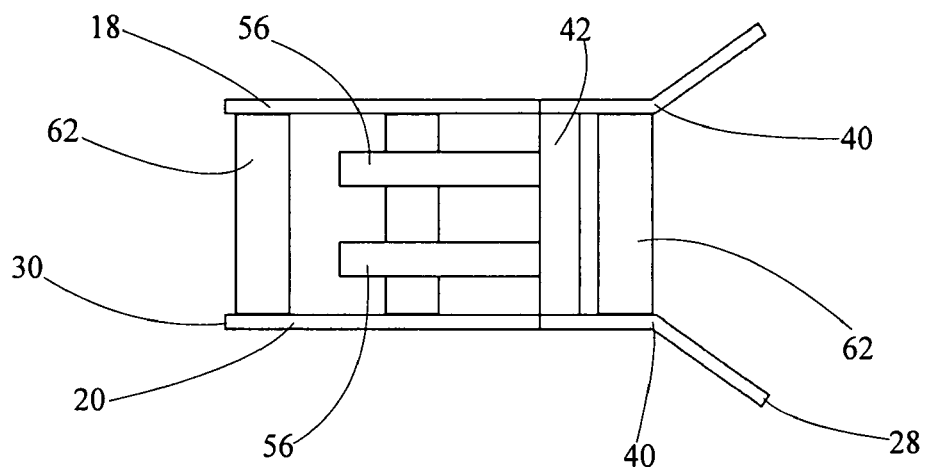
FIG. 4 is a top perspective view of the wire guide in accordance with the preferred embodiments of the present invention.
Figure 5:
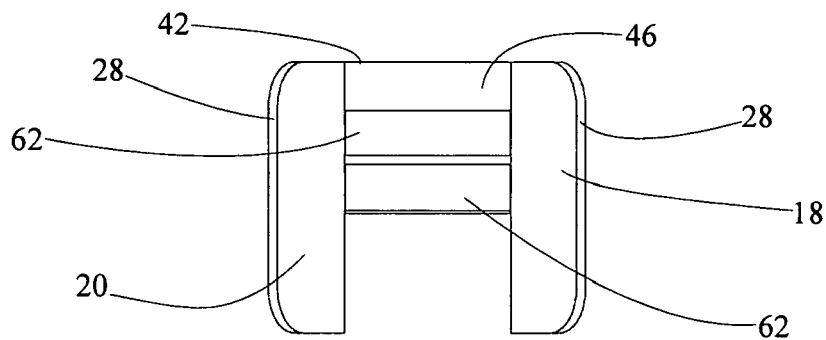
FIG. 5 is a rear perspective view of the wire guide in accordance with the preferred embodiments of the present invention.
Figure 6:
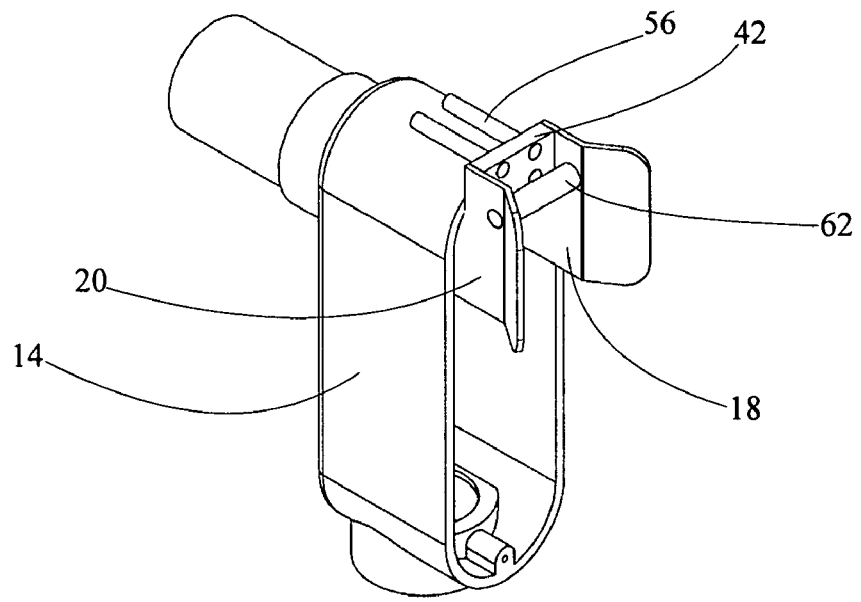
FIG. 6 is a side perspective view of the wire guide removably attached to a rounded rectangular shaped electric box.

FIGS. 1 through 9 show the wire guide 12 of the present invention which can be used for guiding a single wire or a bundle of wires into conduit attached to an electric box 14. As shown in FIGS. 1 and 2, the device consists of a roller frame 16 having a first side plate 18 and a second side plate 20. The side plates 18, 20 are similar in construction and generally rectangular in shape with a portion of the rectangle removed causing the side plates 18, 20 to have a projection 22 extending upwardly resulting in the side plates 18, 20 being semi "L" shaped as illustrated in FIG. 3. The side plates 18, 20 consist of an outside face 24, an inside face 26, a first plate end 28, a second plate end 30, an upward projection front end 32, a first top side 34, a second top side 36, and a bottom side 38.

The first plate ends 28 of the side plates 18, 20 are at an acute angle 40 which commences at a point proximate to the roller assembly 62 which is below the second top side 36 of the side plates 18, 20. The acute angle 40 allows wire to be inserted through the wire guide 12 at a position other than directly in front of the wire guide 12. The acute angle 40 of the first plate ends 28 of the side plates 18, 20 can vary depending upon the size and usage of the wire guide 12.

Fixedly attached to the inside face 26 of the side plates 18, 20 adjacent to the projection front ends 32 is a rectangular plate 42. The rectangular plate 42 consists of a front side 44, a back side 46, a top end 48, a bottom end 50, a first side 52, and a second side 54. The first and second sides 52, 54 of the rectangular plate 42 are fixedly attached to the inside face 26 of the side plates 18, 20 adjacent to the projection front ends 32. Fixedly attached to the front side 44 of the rectangular plate 42 are a pair of top horizontally extending cylindrical rods 56 and a pair of bottom horizontally extending cylindrical rods 58.

Located below the first top side 34 and second top side 36 of the side plates 18, 20 are circular openings 60. Fixedly attached to the circular openings 60 are roller assemblies 62.

Referring to FIG. 2, the roller assemblies 62 consist of a cylindrical roller pin 64 and a roller 66. The cylindrical roller pin 64 has a first end and a second end. The roller 66 is tubular having a first open end and a second open end. The cylindrical roller pin 64 is inserted into an open end of the roller 66. The first and second ends of the cylindrical roller pin 64 extend beyond the open ends of the roller 66. The first and second ends of the cylindrical roller pin 64 are fixedly attached within the circular openings 60 of the side plates 18, 20 resulting in the roller assemblies 62 being rotatably mounted between the side plates 18, 20.

Figure 7:
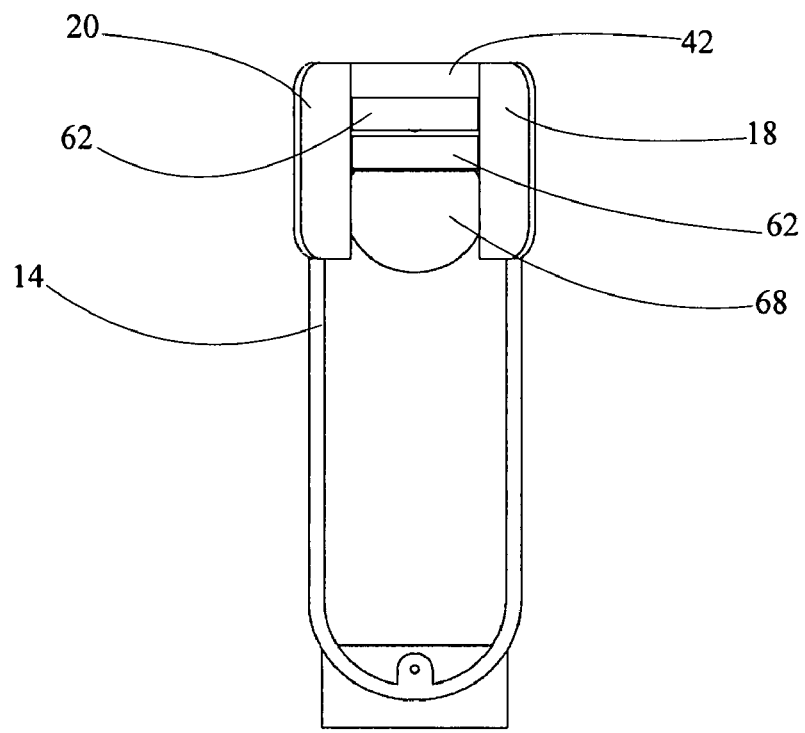
FIG. 7 is a rear perspective view of the wire guide removably attached to a rounded rectangular shaped electric box.
Figure 8:
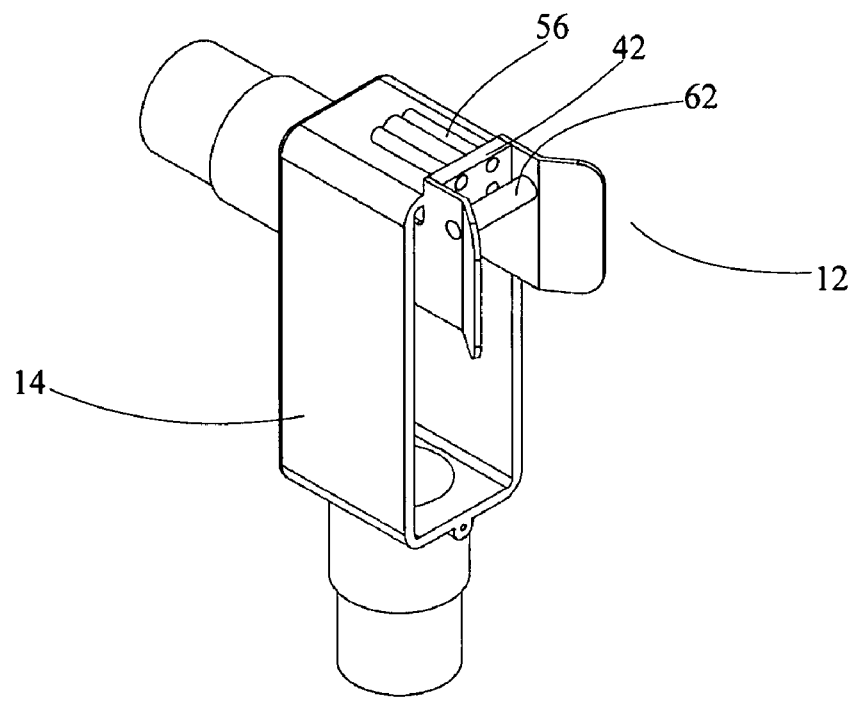
FIG. 8 is a side perspective view of the wire guide removably attached to a square electric box.
Figure 9:
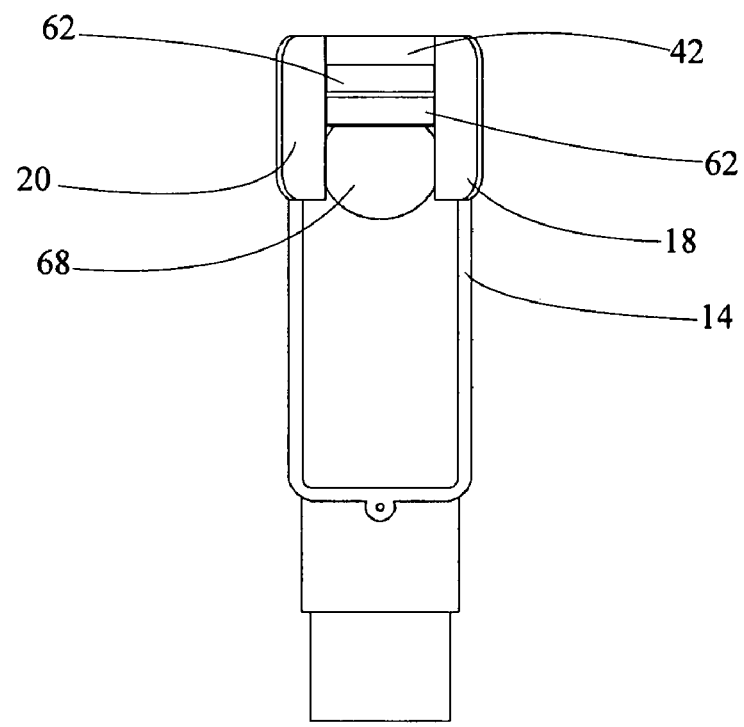
FIG. 9 is a rear perspective view of the wire guide removably attached to a square electric box.

As shown in FIGS. 6, 7, 8 and 9, to utilize the wire guide 12, the user need simply slide the top or bottom cylindrical rods 56, 58 onto the top edge of an electric box 14. Whether the top or bottom cylindrical rods 56, 58 are used depends upon the shape of the electric box 14. As illustrated in FIGS. 7 and 9, once the wire guide 12 has been removably attached to the top edge of the electric box 14, the second plate ends 30 of the side plates 18, 20 are located adjacent to the wire box opening 68 of the electric box 14 into which the wire passes. Thereafter, the user can begin guiding wire into or pulling wire from an electric box 14 with the assistance of the rollers 66 which rollers 66 are aligned with the wire box opening 68.

Although the best mode contemplated by the inventor of carrying out the present invention is disclosed above, practice of the present invention is not limited thereto. It will be manifest that various additions, modifications and rearrangements of the features of the present invention may be made without deviating from the spirit and scope of the underlying inventive concept.

The individual components mentioned herein need not be fabricated from the disclosed materials, but could be fabricated from virtually any suitable and strong materials.

Moreover, the individual components need not be formed in the disclosed shapes, or assembled in the disclosed configuration, but could be provided in virtually any shape, and assembled in virtually any suitable configuration. It is intended that the appended claims cover all such additions, modifications and rearrangements.

| Index of Elements for Wire Guide Assembly | |
|---|---|
| 12 | Wire Guide |
| 14 | Electric Box |
| 16 | Roller Frame |
| 18 | First Side Plate |
| 20 | Second Side Plate |
| 22 | Projection |
| 24 | Outside Face |
| 26 | Inside Face |

| Index of Elements for Wire Guide Assembly -continued | |
|---|---|
| 28 | First Plate End |
| 30 | Second Plate End |
| 32 | Projection Front End |
| 34 | First Top Side |
| 36 | Second Top Side |
| 38 | Bottom Side |
| 40 | Acute Angle of First End |
| 42 | Rectangular Plate |
| 44 | Front Side |
| 46 | Back Side |
| 48 | Top End |
| 50 | Bottom End |
| 52 | First Side |
| 54 | Second Side |
| 56 | Top Cylindrical Rods |
| 58 | Bottom Cylindrical Rods |
| 60 | Circular Openings |
| 62 | Roller Assemblies |
| 64 | Roller Pin |
| 66 | Roller |
| 68 | Wire Box Opening |
| 70 | |
| 72 | |
| 74 | |
| 76 | |
| 78 | |

What is claimed is:

1. A wire guide for an electrical box, comprising:
a first side plate and a second side plate;
a rectangular plate fixedly attached to the first side plate and the second side plate;
a plurality of cylindrical rods fixedly attached to the rectangular plate;
roller assemblies comprised of a cylindrical roller pin and a tubular roller with the cylindrical roller pin being inserted into the tubular roller with the ends of the cylindrical roller pin extending beyond the ends of the tubular roller wherein said plurality of cylindrical rods is substantially perpendicular to said cylindrical roller pin;
a plurality of circular openings on the first side plate and the second side plate to which the ends of the cylindrical roller pin are fixedly attached.

2. The device of claim 1, wherein the ends of the cylindrical roller pin are fixedly attached to the circular openings of the first and second side plates resulting in the rollers being rotatably mounted between the first and second side plates.

3. The device of claim 1, wherein the first and second side plates, roller pins and tubular roller are dimensioned to fit within an electrical outlet box.

4. The device of claim 1, wherein the cylindrical rods are inserted about the top edge of an electric box.

5. The device of claim 1, wherein the first and second side plates, rectangular plate, cylindrical rods, roller pins and rollers are constructed of a durable non-corrosive material.

6. A wire guide for an electrical box, comprising:
a first side plate and a second side plate with each side plate having an outside face, an inside face, a first plate end, a second plate end, an upward projection front end, a first top side, a second top side, and a bottom side;
a rectangular plate having a front side, a back side, a top end, a bottom end, a first side, and a second side which first and second sides of the rectangular plate are fixedly attached to the inside face of the first and second side plates adjacent to the projection front ends;

a plurality of horizontally extending cylindrical rods which cylindrical rods are fixedly attached to the front side of the rectangular plate;

a plurality of circular openings located below the first top sides and second top sides of the first and second side plates; and a plurality of roller assemblies comprised of a cylindrical roller pin having a first end and a second end and a tubular roller having a first open end and a second open end with the cylindrical roller pin inserted into the roller and the first and second ends of the cylindrical roller pin fixedly attached within the circular openings of the first and second side plates wherein said plurality of cylindrical rods is substantially perpendicular to said cylindrical roller pin.

7. The device of claim 6, wherein the first and second side plates are similar in construction and generally rectangular in shape with a portion of the rectangle removed causing the side plates to have a projection extending upwardly resulting in the first and second side plates being semi ᴀL@ shaped.

8. The device of claim 6, wherein the first plate ends of the first and second side plates are at an acute angle which commences at a point proximate to the roller assembly which is below the second top side of the first and second side plates.

9. The device of claim 6, wherein the first and second side plates, roller pins and tubular roller are dimensioned to fit within an electrical outlet box.

10. The device of claim 6, wherein the cylindrical rods are inserted about the top edge of an electric box.

11. The device of claim 6, wherein the first and second side plates, rectangular plate, cylindrical rods, roller pins and rollers are constructed of a durable non-corrosive material.

* * * * *